Sept. 11, 1962 A. J. GRANBERG 3,053,088
ADJUSTABLE LIQUID METER
Filed Nov. 23, 1959 2 Sheets-Sheet 1

INVENTOR.
ALBERT J. GRANBERG
BY
Bruce & Brosler
HIS ATTORNEYS

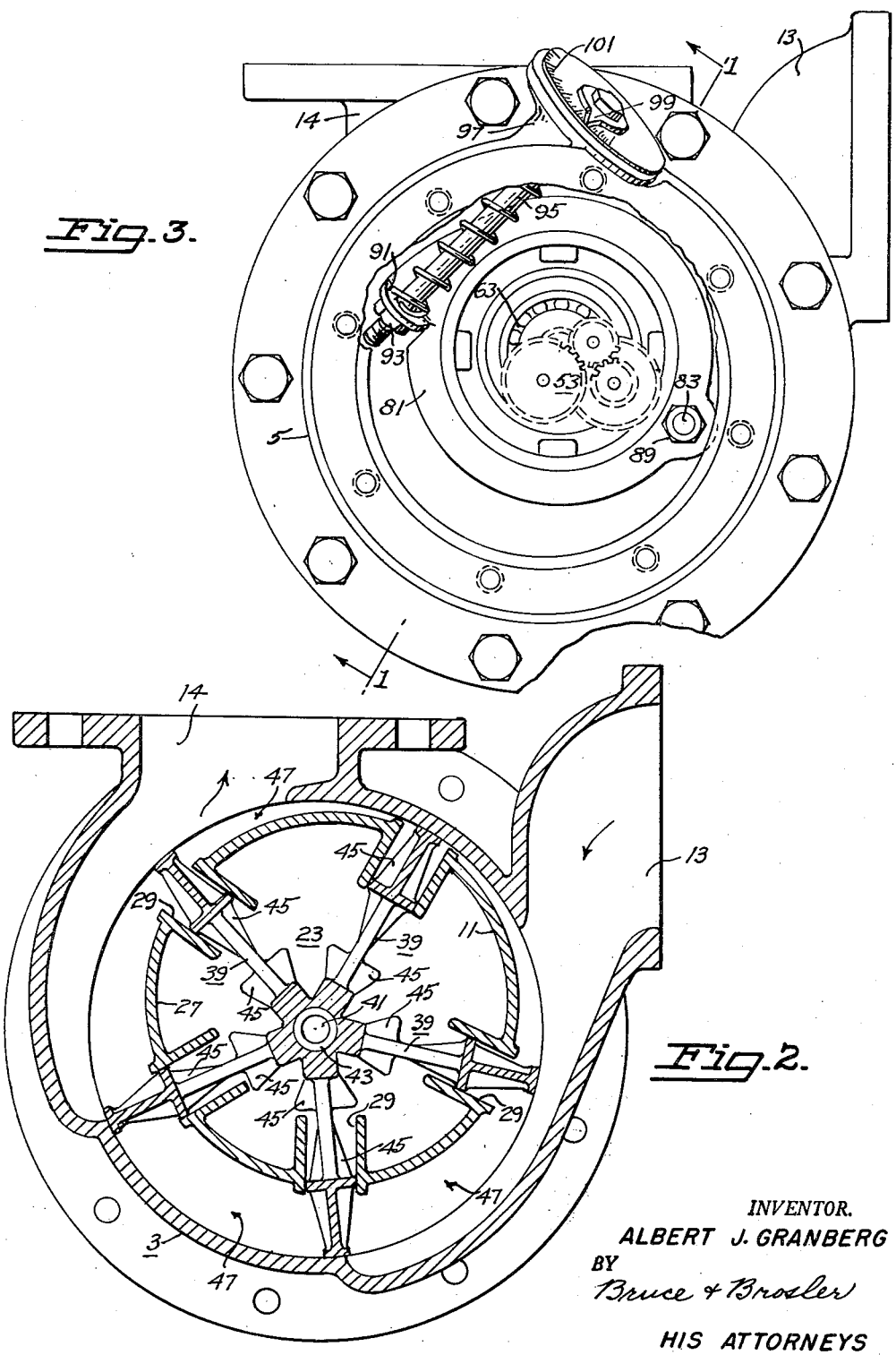

![](United States Patent Office 3,053,088
Patented Sept. 11, 1962)

3,053,088
ADJUSTABLE LIQUID METER
Albert J. Granberg, Oakland, Calif., assignor to Granberg Corporation, a corporation of California
Filed Nov. 23, 1959, Ser. No. 854,811
4 Claims. (Cl. 73—259)

My invention relates to liquid meters and more particularly liquid meters of the positive displacement type.

In the type of meter under consideration, a rotor is employed involving a cylindrical rotor cage having a plurality of equally spaced slots therein and a blade assembly involving a plurality of blades mounted on a common shaft with the blades slidably passing through the slots of the cage. The blade assembly is disposed with the shaft on the central axis of the meter chamber, while the cage is journalled with its axis eccentrically located with respect to the chamber axis.

Among the objects of my invention are:

(1) To provide a novel and improved liquid meter of the positive displacement type;

(2) To provide a novel and improved adjustment for a meter of the positive displacement type;

(3) To provide a novel and improved adjustment for a liquid meter of the positive displacement type, in which the adjustments may be made in a continuous manner;

(4) To provide a novel and improved liquid meter of the positive displacement type in which wear is minimized; and (5) To provide a novel and improved liquid meter of the positive displacement type wherein the rotor bearings are protected against dirt or other foreign matter.

Additional objects of my invention will be brought out in the following description of a preferred embodiment of the same, taken in conjunction with the accompanying drawings wherein:

FIG. 2 is a horizontal view in section taken in the plane 2—2 of FIG. 1;

FIG. 3 is a plan view looking down into the meter of FIG. 1 with its cover removed.

Figures 1, 4:
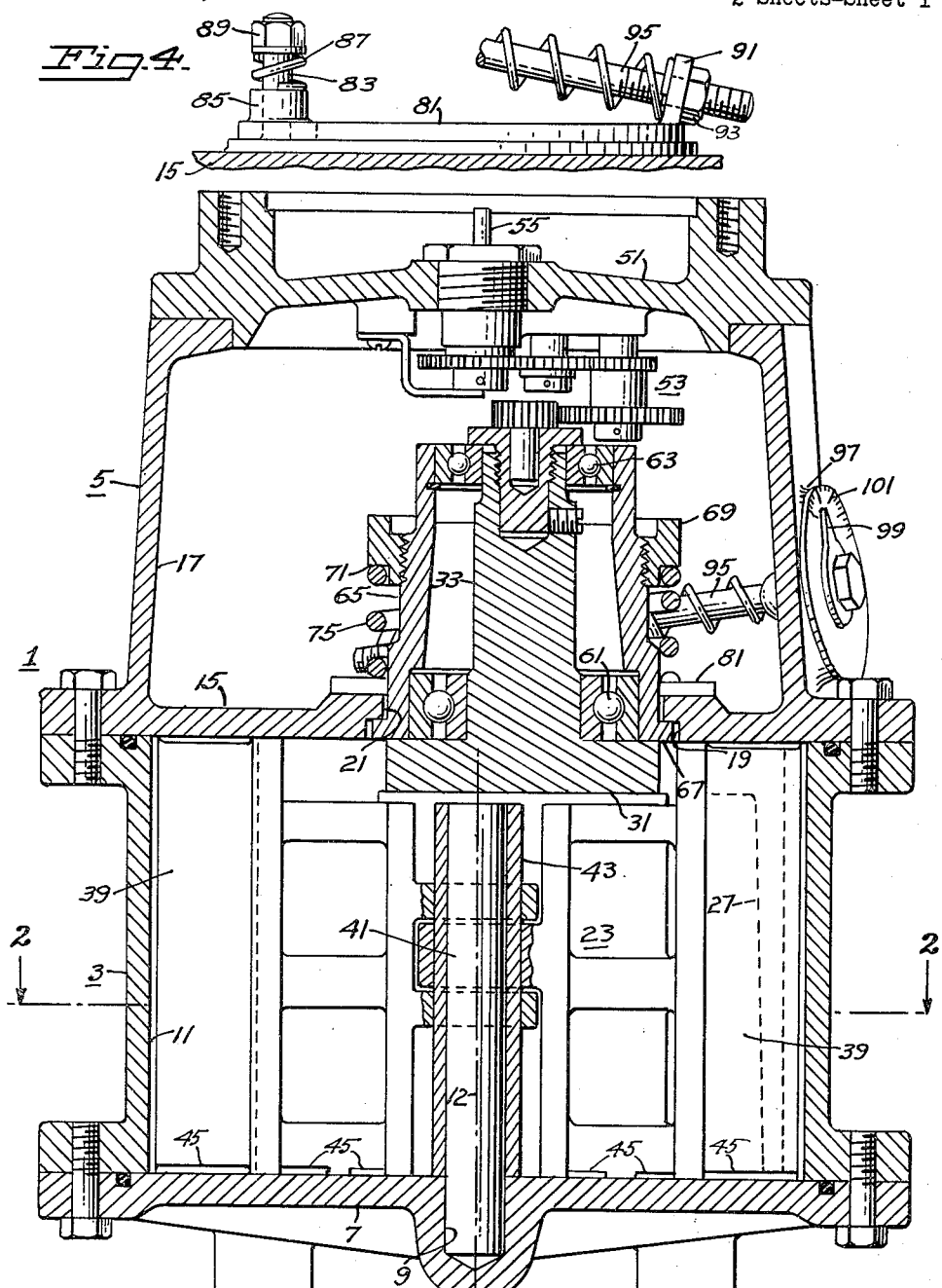
FIG. 1 is a longitudinal view in section, through a meter of the present invention.
FIG. 4 is a view depicting a detail in the structure of the meter of FIG. 1.

Referring to the drawings for details of my invention in its preferred form, the same is depicted in a meter of the vertical type comprising a vertical meter housing 1 having a lower section 3 and an upper section 5, the lower section including a bottom wall 7 with a central recess 9, and a cylindrical wall 11 to define therewith a cylindrical chamber having a vertical longitudinal axis 12 in line with the central recess in the bottom wall 7. The lower section 3 will be formed with a flanged intake passageway 13 into said chamber and a flanged passageway 14 from said chamber.

The upper section of the meter housing includes a bottom wall 15 and a substantially cylindrical wall 17 associated therewith, the bottom wall defining a horizontal partition in the meter housing and having an eccentrically disposed opening 19 therethrough bounded by a circular lip 21.

Within the lower section of the meter housing is the rotor assembly 23 including a rotor cage comprising a cylindrical shell 27 having a plurality of equally spaced longitudinal slots 29 therein, and an end wall 31 with a centrally located stub shaft 33 extending therefrom, the shell 27 being of a diameter substantially less than that of the chamber in the meter housing.

The blade assembly comprises a plurality of blades 39 rotatably mounted about a common shaft 41, preferably with an intermediate bushing 43, the various blades being then rotatably disposed on the bushing. Each of the blades slidably extends through one of the slots in the rotor cage, and in the vertical type meter illustrated, each blade, in addition, is provided with pads 45 at its lower edge in contact with the floor of the chamber to minimize rotational wear.

The rotor assembly is disposed in the meter chamber with one end of the common blade shaft 41 pressed into the bottom recess 9 and with the shell eccentrically disposed with respect to the axis 12 of the chamber, to bring the stub shaft 33 up through the eccentrically disposed opening 19 in the horizontal partition to create peripheral chambers 47 of varying capacity about the shell.

Spanning the upper end of the meter housing is a cover plate 51 with provision for mounting thereon, a suitable counter or the like (not shown). A gear train drive 53 from the upper end of the stub shaft through the cover plate, terminates in a clutch element 55 adapted for coupling to such counter for registering rotational movements of the rotor assembly.

Rotation of the rotor assembly is stabilized by journalling the stub shaft in a pair of spaced bearing assemblies 61, 63 in a sub-housing 65 surrounding the stub shaft and at its lower end, terminating in a horizontal flange 67 underlying the lip 21 which bounds the partition opening 19. A collar 69 threaded about the sub-housing is formed with a shoulder 71, which functions as one abutment for a compression spring 75 disposed between it and the horizontal partition 15, to exert an upward lift on the sub-housing and maintain a pressure contact between the sub-housing flange 67 and the lip 21.

For enabling adjustments of the meter, in the inerest of securing accuracy thereof, the diameter of the sub housing at its lower or flange end is purposely somewhat less than the diameter of the partition opening beneath the lip, to allow for limited shifting of the sub housing, which in turn will act on the rotor assembly to bring about a corresponding shift of the rotor cage to the exclusion of the blade assembly. This will bring about a slight change in volume to the chambers 47 about the rotor cage, whereby some of the chambers can be increased or decreased in volume, while those diametrically opposite, will be altered in the reverse order, to thereby alter the capacity of the meter in the direction desired.

To enable such shift and permit control thereof from a point externally of the meter housing, a substantially circular lever shift plate 81 having a hole therethrough of a size adapting the plate to fit over the sub housing 65 prior to application of the collar 69 and spring 75, and provide a snug fit therewith at the surface of the partition 15, is placed in such position, between the said partition and the lower end of the compression spring 75, the plate being pivotally secured to the partition adjacent the periphery of the plate, by a pivot bolt 83 extending upwardly from the partition, the plate being held at this point by a pressure collar 85 bearing against the plate under the compressive action of a spring 87 about the bolt and held under compression by an adjusting nut 89.

At a point substanially diametrically opposite the pivot mounting of the lever shift plate 81, the plate is provided with an unturned lug or tab 91 which is provided with a threaded hole or affixed nut 93 to receive an adjusting screw 95. Such screw extends throgh a boss 97 on the meter housing to threadedly engage the upstanding tab on the lever plate, the adjusting screw at its externally exposed end, carrying an indicator or pointer 99 for registering with an adjustment scale 101 affixed to the boss. Thus, by rotating the screw in either direction, a corresponding slight shift of the rotor cage can be effected to adjust the meter for accuracy. In this connection, the first two gears in the gear drive are so located with respect to each other that meshing thereof is not disturbed by adjustments of the sub-housing.

With the rotor assembly installed in substantially the mid-position of its permissible range of adjustment, and with the indicator 99 set at zero reading, the meter will then be capable of adjustment in a plus or minus direction to effect an accurate setting thereof.

When once adjusted, and if it is desired to discourage tampering with the adjustment by unauthorized individuals, a cap may be disposed over the adjusting end of the screw and associaed dial, and bolted down with suitable machine screws.

From the foregoing description of my invention in its preferred form, it will be apparent that the same is subject to alternation and modification without departing from the underlying principles involved, and I accordingly do not desire to be limited to the specific details illustrated and described except as may be necessitated by the appended claims.

I claim:

1. A liquid meter comprising a vertical meter housing having a lower section and an upper section, said lower section including a bottom wall, and a cylindrical wall to define with said bottom wall, a cylindrical chamber, said upper section having a bottom defining a horizontal partition in said housing and having an eccentrically disposed opening therethrough; a rotor assembly including a rotor cage comprising a cylindrical shell having a plurality of equally spaced longitudinal slots therein and an end wall with a stub shaft extending therefrom, said shell being of a diameter less than that of said chamber, a plurality of blades rotatably mounted about a common shaft within said shell and slidably extending, each through one of said slots, said rotor assembly being disposed in said cylindrical chamber with said common blade shaft on the longitudinal axis of said chamber and with said shell stub shaft extending upwardly through said eccentrically disposed opening in said horizontal partition, to create peripheral chambers of varying size about said shell; and means for adjustably shifting said shell with respect to said common blade shaft to alter the measuring capacity of said meter, said means including a tubular sub-housing about said stub shaft and having a lower end of somewhat less diameter than said partition opening, bearing means between said stub shaft and said sub-housing, and means engaging said sub-housing and extending through said meter housing for controllably shifting said sub-housing to effect a corresponding shift of said rotor cage.

2. A liquid meter comprising a vertical meter housing having a lower section and an upper section, said lower section including a bottom wall, and a cylindrical wall to define with said bottom wall, a cylindrical chamber, said upper section having a bottom defining a horizontal partition in said housing and having an eccentrically disposed opening therethrough, a rotor assembly including a rotor cage comprising a cylindrical shell having a plurality of equally spaced longitudinal slots therein and an end wall with a stub shaft extending therefrom, said shell being of a diameter less than that of said chamber, a plurality of blades rotatably mounted about a common shaft within said shell and slidably extending, each through one of said slots, said rotor assembly being disposed in said cylindrical chamber with said common blade shaft on the longitudinal axis of said chamber and with said shell stub shaft extending upwardly through said eccentrically disposed opening in said horizontal partition, to create peripheral chambers of varying size about said shell; a cover spanning the upper end of said upper section; a drive from said stub shaft and extending through said cover; and means for adjustably shifting said shell with respect to said common blade shaft to alter the measuring capacity of said meter, said means including a tubular sub-housing about said stub shaft and having a lower end of somewhat less diameter than said partition opening, a pair of vertically spaced bearing assemblies between said stub shaft and said sub-housing, a lever shift plate snugly fitting about said sub-housing, pivot means anchoring said plate at a point adjacent its periphery to said partition, an adjusting screw passing through the wall of said meter housing and threadedly connecting with said shift plate at a point substantially opposite said pivot means.

3. A liquid meter comprising a vertical meter housing having a lower section and an upper section, said lower section including a bottom wall, and a cylindrical wall to define with said bottom wall, a cylindrical chamber, said upper section having a bottom and a substantially cylindrical wall, with said bottom defining a horizontal partition in said housing and having an eccentrically disposed opening therethrough bounded by a circular lip; a rotor assembly including a rotor cage comprising a cylindrical shell having a plurality of equally spaced longitudinal slots therein and an end wall with a stub shaft extending therefrom, said shell being of a diameter less than that of said chamber, a plurality of blades rotatably mounted about a common shaft within said shell and slidably extending, each through one of said slots, said rotor assembly being disposed in said cylindrical chamber with said common blade shaft on the longitudinal axis of said chamber and with said shell stub shaft extending upwardly through said eccentrically disposed opening in said horizontal partition, to create peripheral chambers of varying size about said shell; a cover spanning the upper end of said upper section; and means for adjustably shifting said shell with respect to said common blade shaft to alter the measuring capacity of said meter, said means including a tubular sub-housing about said stub shaft and having a lower end of somewhat less diameter than said partition opening and provided with a peripheral flange underlying said circular lip, a pair of vertically spaced bearing assemblies between said stub shaft and said sub-housing, a lever shift plate snugly fitting about said sub-housing, pivot means anchoring said plate at a point adjacent its periphery to said partition, an adjusting screw passing through the wall of said meter housing and threadedly connecting with said shift plate at a point substantially opposite said pivot means.

4. A liquid meter comprising a vertical meter housing having a lower section and an upper section, said lower section including a bottom wall with a central recess, and a cylindrical wall to define wtih said bottom wall, a cylindrical chamber with said central recess on the longitudinal axis of said chamber, said upper section having a bottom and a substantially cylindrical wall, with said bottom defining a horizontal partition in said housing and having an eccentrically disposed opening therethrough bounded by a circular lip; a rotor assembly including a rotor cage comprising a cylnidrical shell having a plurality of equally spaced longitudinal slots therein and an end wall with a centrally located stub shaft extending upwardly therefrom, said shell being of a diameter less than that of said chamber, a plurality of blades rotatably mounted about a common shaft within said shell and slidably extending, each through one of said slots, said rotor assembly being disposed in said cylindrical chamber with one end of said common blade shaft set in said bottom recess and with said shell stub shaft extending upwardly through said eccentrically disposed opening in said horizontal partition, to create peripheral chambers of varying size about said shell; a cover spanning the upper end of said upper section for the mounting of a counter or the like; a drive from said stub shaft and extending through said cover for coupling to such counter or the like to register passage of liquid through said meter; and means for adjustably shifting said shell with respect to said common blade shaft to alter the measuring capacity of said meter, said means including a tubular sub-housing about said stub shaft and having a lower end of somewhat less diameter than said partition opening and provided with a peripheral flange underlying said circular lip, a pair of vertically spaced bearing assemblies between said stub shaft and said sub-housing, a lever shift plate snugly fitting about said sub-housing, pivot means anchoring said plate at a point adjacent its periphery to said partition, an adjusting screw passing through the wall of said meter housing and threadedly connecting with said shift plate at a point substantially opposite said pivot means, and a calibrated scale and indicator associated with said adjusting screw.

References Cited in the file of this patent
UNITED STATES PATENTS

| | | |
|---|---|---|
| 2,022,631 | Woodford | Nov. 26, 1935 |
| 2,286,411 | Hazard | June 16, 1942 |
| 2,321,785 | Woodford et al. | June 15, 1943 |